A. H. REID.
APPARATUS FOR TREATING CREAM, MILK, &c.
APPLICATION FILED AUG. 10, 1908.

944,634. Patented Dec. 28, 1909.

2 SHEETS—SHEET 1.

Witnesses
Raymond F. Barnes
Luther E. Morrison

Inventor
Alban H. Reid
By P. T. Dodge
Attorney

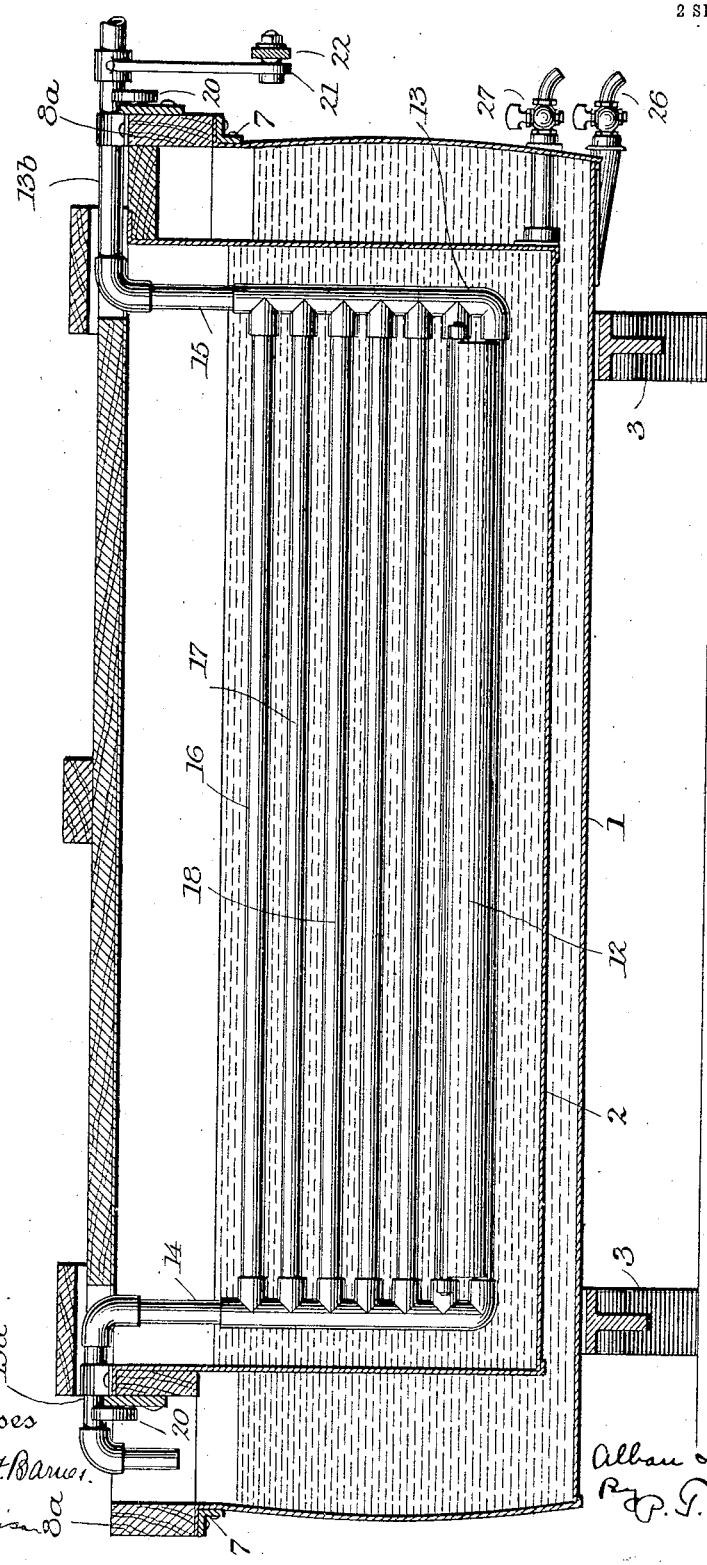

UNITED STATES PATENT OFFICE.

ALBAN H. REID, OF PHILADELPHIA, PENNSYLVANIA.

APPARATUS FOR TREATING CREAM, MILK, &c.

944,634. Specification of Letters Patent. Patented Dec. 28, 1909.

Application filed August 10, 1908. Serial No. 447,767.

*To all whom it may concern:*

Be it known that I, ALBAN H. REID, of Philadelphia, county of Philadelphia, and State of Pennsylvania, have invented a new and useful Improvement in Apparatus for Treating Cream, Milk, &c., of which the following is a specification.

This invention relates to vats or tanks for treating milk or cream, and is designed more particularly for use in subjecting cream to the ripening process preparatory to its churning into butter. Vats for this general purpose comprise usually an outer casing or jacket, and an inner vessel or vat proper to receive the cream or milk to be treated, which vat is mounted within the casing so as to leave a space between the two for the circulation of a heating or cooling medium, as the case may be, an agitator being usually provided in the vat to subject the contents to a stirring or agitating action.

My invention consists of various improvements in constructions of this character, directed more particularly to the form and arrangement of the inclosing casing or jacket; the manner of sustaining and supporting the same; the form and construction of the inner vessel or vat proper; the means for supporting the same within the outer casing; the form and construction of the agitator, and various other features, as will be fully described in the specification.

Figure 1:
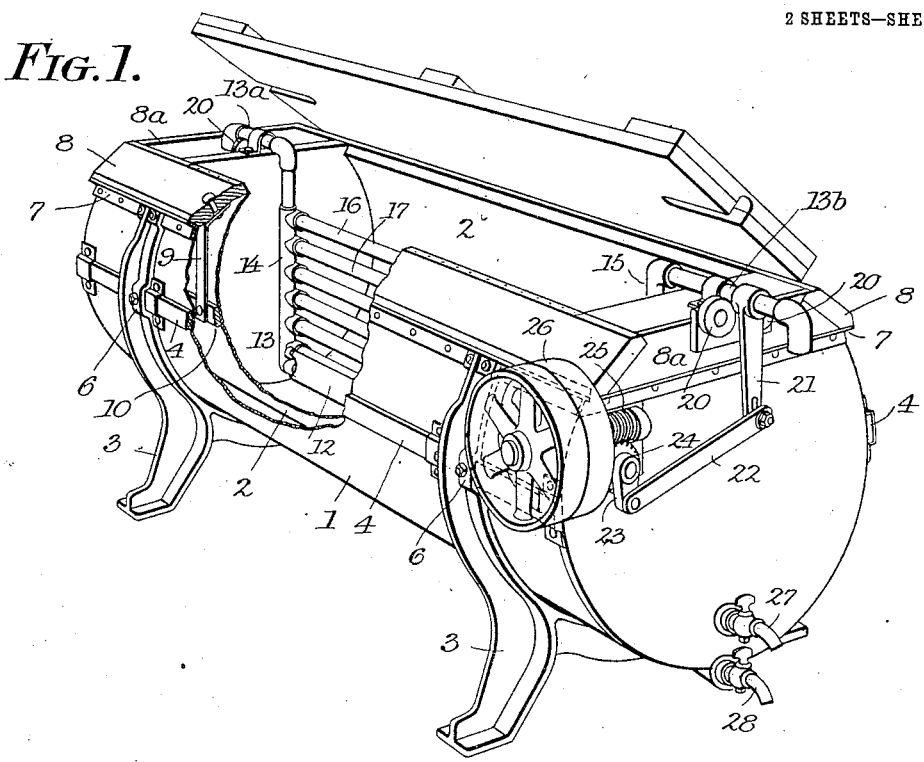
Figure 2:
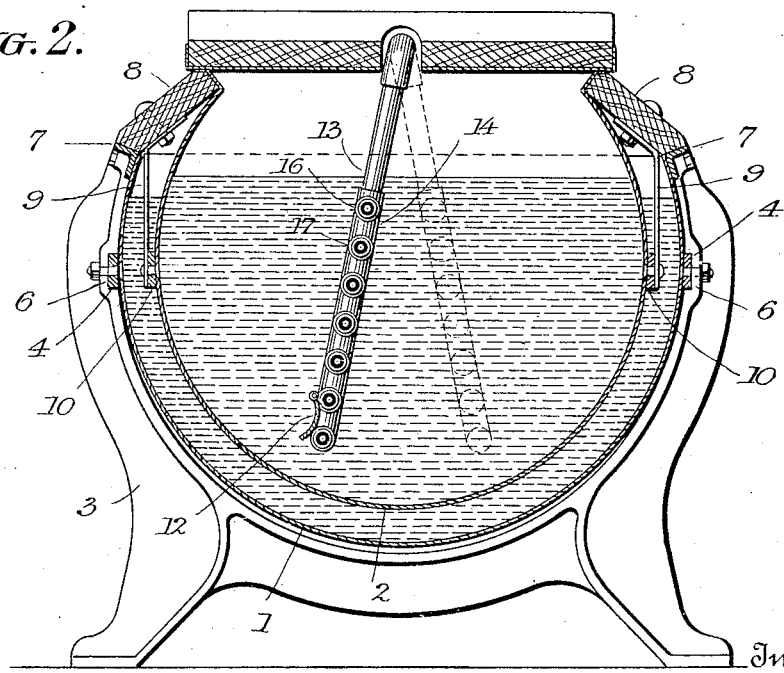

In the accompanying drawings:—Figure 1 is a perspective view of my improved apparatus, a portion of the outer casing being broken away to expose the internal construction. Fig. 2 is a cross-section through the same, with parts in elevation. Fig. 3 is a central longitudinal sectional elevation through the apparatus.

Referring to the drawings:—my improved apparatus comprises, as its essential features, an outer jacket or casing 1, preferably of metal, of cylindrical form closed at its ends and open at its top, and an inner vessel or vat proper 2 also of metal and similar in form to the casing and arranged within the same so as to leave a space between the two, which space surrounds the vat, the latter being designed to receive the milk or cream to be treated, and the intervening space being designed to receive the heating or cooling medium, as the case may be.

The outer casing is supported by two legs or frames 3, in the form of castings nearly circular in shape to surround the cylindrical casing, the latter being connected with the legs by means of two suspension bars 4 fixed to opposite sides of the casing and extending longitudinally thereof from end to end and seated and secured firmly in alining sockets 6 in the inner sides of the legs. The suspension bars are secured at points on the sides of the casing where the strain, due to the weight of the contents, will act vertically and edgewise on the bars, which points are at diametrically opposite sides of the casing and at its greatest diameter, so that the bars take the whole weight of the casing and give entire support to the same, sustaining its bottom free of the surrounding legs, as clearly shown in Figs. 1 and 2. At its upper edge the casing has firmly fixed to it a rectangular frame 7, preferably of angle iron, which is bolted to the upper ends of the legs; whereby the casing is strengthened and rendered extremely rigid at this point.

Extending upwardly from the sides of the rectangular frame 7, and firmly fixed thereto, are side rails 8 and end rails 8ª, preferably of wood, to the inner sides of which side rails are bolted the upper ends of suspension braces 9, two or more on each side, the lower ends of which are bolted to horizontal suspension bars 10, fixed to the opposite sides of the vat 2, by means of which the vat is suspended within the outer casing from the top of the latter, thereby leaving the intervening space between the vat and casing free and wholly unobstructed, so as not to interfere with the circulation of the heating medium. These supension bars, like those on the outer casing, are fixed to the sides of the vat at points where the weight is exerted downwardly edgewise on the bars, which points are at diametrically opposite sides of the vat at its greatest diameter, the braces extending vertically upward to their point of attachment to the side rails 8, and the strain on the braces being thus exerted in the direction of their length; whereby they are best adapted to give firm and proper suspension support to the vat. By forming these braces sufficiently stiff and rigid, they will serve to prevent the sides of the vat collapsing or approaching each other, which action would otherwise result from the sagging of the bottom under the weight of the contents. The upper edge of the vat is fastened along the edges of the side rails 8 so that the vat is rendered stiff and maintained in shape at this point.

In order that the contents of the vat may be properly stirred or agitated, I provide an agitator blade 12, preferably of concavo-convex form in cross-section, extending longitudinally within the vat and hinged at its upper edge to a vibrating support 13 so as to act near the bottom of the vat, means being provided for holding the blade against pivotal action when the support is swung in one direction; whereby it will act to propel the cream and set up a flow of the same, the movement of the blade in the opposite direction causing it to rock on its axis so as not to interfere with the flow, by which means the cream is turned over in the vat and given a rotary circulating motion. The support by which the blade is thus vibrated and actuated may be of any suitable character provided it will cause the blade to operate as described, but I prefer to employ for this purpose a coil of pipe consisting of vertical end manifolds 14 and 15 connected together by horizontal pipes 16, 17, etc., which coil is pivotally sustained within the vat by horizontal trunnions formed by horizontal outwardly extending pipes 13ª and 13ᵇ connected respectively with the upper ends of the manifolds 14 and 15, which trunnions are mounted on friction rollers 20 journaled on the end rails 8ª of the casing 1. The agitating blade 12 is pivoted at its upper edge to the horizontal pipe of the coil next the lowermost one, and is prevented from pivoting, when the coil is swung in one direction, by contacting with the lowermost pipe, which latter acts as a stop for the lower edge of the blade.

The coil may be vibrated by any appropriate means. As here shown, the trunnion 13ᵇ is provided with an operating arm 21 connected by a link 22 with the end of a crank-arm 23 fixed to a worm wheel 24, which is driven by a worm 25 on a shaft provided with a driving pulley 26, the rotation of the pulley causing the operating arm to be vibrated, which will act to vibrate the coil and cause the agitating blade to operate as described.

The agitating blade may be flat instead of concavo-convex in cross-section, the essential requirement being that when swung in one direction within the vat it will act against the fluid and set up a flow, and when swung in the opposite direction it will yield on its pivotal axis so as not to counteract the said flow by propelling the fluid in the opposite direction.

The contents of the vat may be drawn off by discharge spout 27 leading from the vat and through the end of the casing 1, which latter is provided with a discharge spout 28 to permit the water or other heating or cooling medium to be drawn off.

Having thus described my invention, what I claim is:—

1. In an apparatus of the type described, the combination of sustaining legs or frames, a casing, and horizontal suspension bars fixed to the sides of the casing and extending longitudinally thereof and connected with the legs.

2. In an apparatus of the type described, the combination with a horizontal cylindrical casing, of horizontal suspension bars fixed to opposite sides of the casing, and sustaining legs or frames surrounding the casing and provided with sockets to receive the bars.

3. In an apparatus of the type described, the combination of an inclosing casing, a vat situated within the same with a space between the two, and vertical braces fixed at their upper ends to the casing and fastened at their lower ends to the sides of the vat.

4. In an apparatus of the type described, the combination of an inclosing casing, a cylindrical vat situated within the same with a space between them, horizontal supporting bars fixed to opposite sides of the vat and extending longitudinally thereof, and means for suspending said bars from the casing.

5. In an apparatus of the type described, the combination with an inclosing casing, of a cylindrical vat situated within the same with a space between them, horizontal longitudinally extending suspension bars fixed to opposite sides of the vat, and vertical braces fixed at their upper ends to the casing and fastened at their lower ends to the suspension bars.

6. An apparatus for treating milk or cream, comprising an outer cylindrical casing or shell, sustaining legs surrounding the same, horizontal longitudinally extending suspension bars fixed to opposite sides of the casing and fastened to the legs, a horizontal cylindrical vat situated within the casing with a space between them, horizontal longitudinally extending suspension bars fixed to opposite sides of the vat, and vertical braces fastened at their upper ends to the top of the casing and fastened at their lower ends to the suspension bars on the vat.

7. In combination with an inclosing casing, a horizontal metal cylindrical vat situated within the same with a space between the two, and rigid braces connected at their upper ends to the casing and at their lower ends to the sides of the vat; whereby the said braces will prevent the sides of the vat from collapsing under the weight of the contents.

8. In an apparatus for treating cream or milk, and in combination with a vat to receive the cream or milk, a vibratory device movable back and forth in said vat, and an agitating blade pivoted to the vibratory device so that when the latter is moved in one direction the blade will be presented edgewise.

9. In an apparatus for treating cream or milk, and in combination with a vat to receive the cream or milk, an agitating blade extending longitudinally within the vat, a vibrating support for said blade to which the blade is pivoted on a longitudinal horizontal axis whereby the blade will be presented edgewise when the support is vibrated in one direction, and means for preventing the pivotal motion of the blade when the support is vibrated in the other direction.

10. In an apparatus for treating cream or milk, etc., the combination with a vat, of a vibratory device movable back and forth therein, an agitating blade pivoted to the vibratory device and formed with a concave or dished face, said blade being free to swing on its pivot when the vibratory device is moved in one direction, and means for holding the said blade against pivotal action when the vibratory device is moved in the opposite direction with the concavity of the blade facing in the direction of movement.

In testimony whereof I hereunto set my hand this twentieth day of July, 1908, in the presence of two attesting witnesses.

ALBAN H. REID.

Witnesses:
WM. M. TAYLOR,
C. McGLADE.